B. SLJUJO.
GRAIN FORK.
APPLICATION FILED MAY 27, 1916.
1,199,214.
Patented Sept. 26, 1916.
Fig. 1.
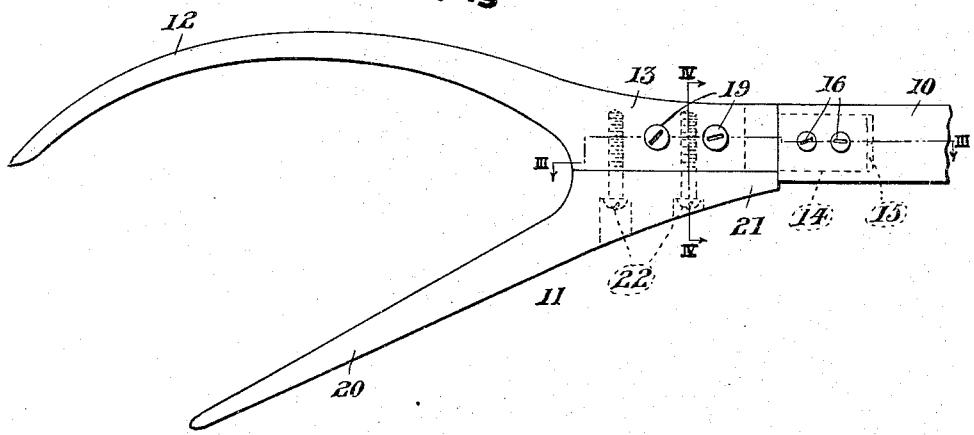
Fig. 2.
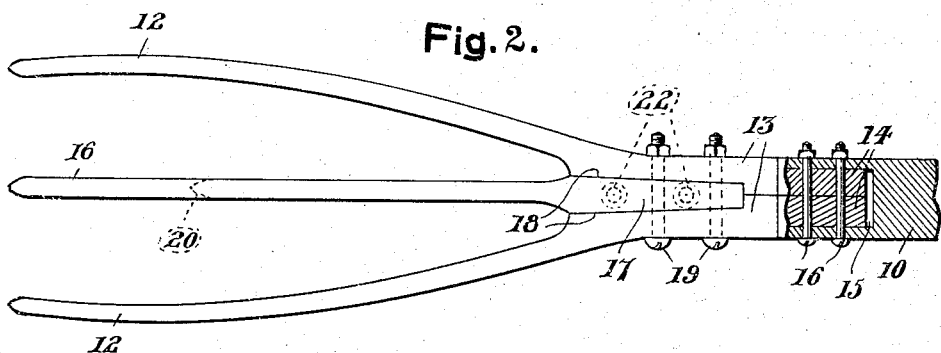
Fig. 5. Fig. 4. Fig. 3.
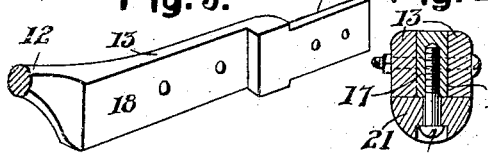 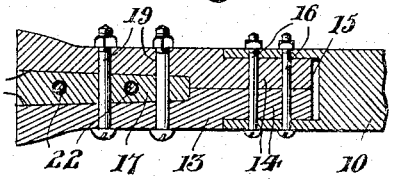
Fig. 6. Fig. 7.
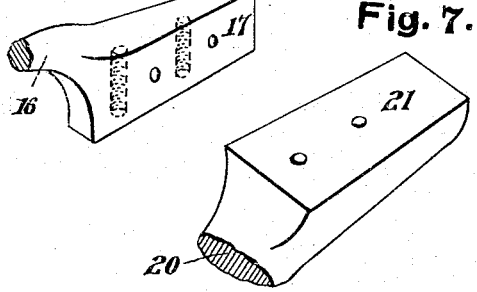
Inventor
B. Sljujo
By A. M. Wilson
Attorney

UNITED STATES PATENT OFFICE.

BARIŠA SLJUJO, OF VAN HOUTEN, NEW MEXICO.

GRAIN-FORK.

1,199,214. Specification of Letters Patent. Patented Sept. 26, 1916.

Application filed May 27, 1916. Serial No. 100,419.

*To all whom it may concern:*

Be it known that I, BARIŠA SLJUJO, a subject of the King of Hungary, residing at Van Houten, in the county of Colfax and State of New Mexico, have invented certain new and useful Improvements in Grain-Forks, of which the following is a specification.

This invention relates to certain new and useful improvements in grain forks.

The primary object of the invention is the provision of a fork especially adapted for handling grain, the arrangement being such as to allow for the ready grasping of the sheaf or bundle of grain without mutilating the same, the fork being easily removed therefrom when the sheaf or bundle has been deposited in the desired position.

A further object of the device is the provision of a wooden tined fork arranged somewhat in the form of a human hand with the tines thereof readily removable for inserting new ones in the event of the fork becoming damaged.

A still further object is to provide a fork that is of extremely light weight and adapted for handling grain, the same being of simple construction, and easily and cheaply manufactured.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—Figure 1 is a side elevation of the device with the handle broken away. Fig. 2 is a plan view thereof. Figs. 3 and 4 are longitudinal and transverse sectional views respectively, taken upon lines III—III and IV—IV of Fig. 1, and Figs. 5, 6 and 7 are perspective views of the butt or mounting ends of the different forms of tine members employed in the device.

While the present fork is preferably formed of wood, some suitable metal may be employed if desired, the invention broadly consisting of a pole form of handle 10 and a tined head 11. The said head 11 consists of oppositely arranged lateral tines 12 having a double curve and arranged with attaching bases 13 provided with reduced extensions 14 positionably in engagement with each other within a receiving socket 15 in the free end of the handle 10, transverse bolts 16 being arranged through the handle and the extensions 14 for retaining the bases 13 firmly although removably secured to the handle.

A medial tine 16 is positionable centrally between the tines 12 having a corresponding curvature and provided with a foot-shaped base 17 positioned within cut-away portions 18 of the tine bases 13, securing bolts 19 being secured transversely through the said bases 13 and intermediate foot 17. The aforementioned tines 12 and 16 are arranged somewhat in the form of the fingers of a hand with the aforementioned bases and foot corresponding to a wrist portion, while a fourth tine 20 of substantially straight tapered formation corresponds to a thumb, being obliquely arranged adjacent the concavity of the tines 12 and 16 and in substantially the same plane as the medial tine 16. The thumb tine 20 is provided with a base 21 adapted to flatly engage the adjacent edges of the bases 13 and foot 17 being removably secured in position by means of screws 22 extending through the base 21 and into the foot 17.

From this detailed description of the entire device, it will be seen that the tines 12, 16 and 20 are readily assembled and separated when desired while the handle 10 may be also easily detached, which allows for the ready replacement of a new tine in the event that any one of the same becomes broken, dulled or in any manner incapacitated for use. The hand form of fork allows the tines to be readily forced into the ground by means of the handle 10, it being understood that all of the tines have similar pointed free ends 23 allowing not only the sheaves to be readily picked up by the fork but allowing the easy removal of the fork therefrom when the sheaf is deposited. The curvature of the finger tines 12 and 16 and the oblique arrangement of the thumb tine 20 provides a slight wedging of the grain within the hand-shaped head for grasping and removably retaining the same.

What I claim as new is:—

A fork comprising a handle having a socket, pointed lateral tines formed in a double curve and having oppositely arranged bases provided with reduced extensions removably secured within the said socket and being further arranged with inner cut-away portions, a medially curved tine having a flattened foot removably secured between the said bases within the said cut-away portions thereof, and a tapered thumb tine obliquely positioned in opposition to the concaved side of the said medial tine and provided with a base flatly engaging the said foot and lateral tined bases, and detachable connections between the said foot and thumb tined base.

In testimony whereof I affix my signature.

BARIŠA SLJUJO.

Copies of this patent may be obtained for five cents each, by addressing the "Commissioner of Patents. Washington, D. C."